(12) United States Patent
Singh et al.

(10) Patent No.: US 9,876,560 B1
(45) Date of Patent: Jan. 23, 2018

(54) DYNAMIC ALLOCATION OF RESOURCES TO A WIRELESS RELAY NODE

(71) Applicant: Sprint Communications Company L.P., Overland Park, KS (US)

(72) Inventors: Jasinder Pal Singh, Olathe, KS (US); Siddharth Oroskar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 111 days.

(21) Appl. No.: 15/087,087

(22) Filed: Mar. 31, 2016

(51) Int. Cl.
*H04B 7/155* (2006.01)
*H04W 72/12* (2009.01)

(52) U.S. Cl.
CPC .... *H04B 7/15542* (2013.01); *H04W 72/1236* (2013.01)

(58) Field of Classification Search
CPC ............... H04B 7/15542; H04W 72/1236
See application file for complete search history.

(56) References Cited

U.S. PATENT DOCUMENTS

| 8,885,542 | B2 | 11/2014 | Bucknell et al. | |
|---|---|---|---|---|
| 2010/0265823 | A1* | 10/2010 | Zhao | H04W 28/12 370/233 |
| 2011/0261747 | A1 | 10/2011 | Wang et al. | |
| 2012/0287790 | A1 | 11/2012 | Huang et al. | |
| 2013/0090121 | A1* | 4/2013 | Zhang | H04W 28/08 455/450 |
| 2013/0294327 | A1* | 11/2013 | Horn | H04W 88/04 370/315 |
| 2017/0086090 | A1* | 3/2017 | Sharma | H04L 65/403 |

* cited by examiner

*Primary Examiner* — Duc C Ho

(57) ABSTRACT

Systems, methods, and software described herein provide enhancements for allocating Long Term Evolution (LTE) resources to a wireless relay node. In one implementation, a method of operating a LTE access node includes receiving device summary reports from a wireless relay node that indicate at least the quantity of wireless communication devices connected to the wireless relay node. Based on the received summaries, the LTE access node may determine scheduling weights for the wireless relay node, wherein the scheduling weights indicate a probability of scheduling resources in comparison to other wireless communication devices communicating using the same quality of service class identifier as the wireless relay node.

20 Claims, 9 Drawing Sheets

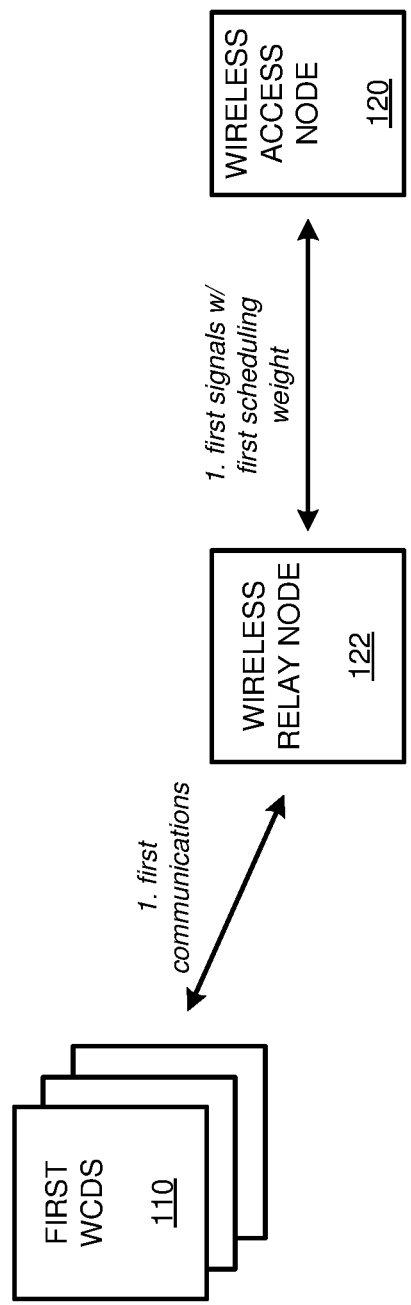

SCHEDULING WEIGHT DATA STRUCTURE
500

| NUMBER OF DEVICES COLUMN 510 | WEIGHT COLUMN 520 |
|---|---|
| QUANTITY | WEIGHT |
| QUANTITY | WEIGHT |
| QUANTITY | WEIGHT |
| QUANTITY | WEIGHT |

FIGURE 5

SCHEDULING WEIGHT DATA STRUCTURE
600

| NUMBER OF DEVICES COLUMN 610 | NUMBER OF CA DEVICES COLUMN 615 | WEIGHT COLUMN 620 |
|---|---|---|
| QUANTITY | QUANTITY | WEIGHT |
| QUANTITY | QUANTITY | WEIGHT |
| QUANTITY | QUANTITY | WEIGHT |
| QUANTITY | QUANTITY | WEIGHT |

FIGURE 6

DYNAMIC ALLOCATION OF RESOURCES TO A WIRELESS RELAY NODE

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some implementations, communication systems, such as Long Term Evolution (LTE) communication systems may employ relay nodes that can act as an intermediary between a macro LTE access node or base station and the end wireless communication devices. Accordingly, when a wireless communication device requires a communication, the device may transmit data to the relay node, which in turn, transmits the data to the macro LTE access node. Similarly, when data is to be received by the wireless communication device, the macro LTE access node may transmit data to the wireless relay node, which forwards the data to the end wireless communication device.

However, while relay nodes may provide an effective method of distributing wireless resources and signaling to wireless communication devices, it often becomes difficult for the macro wireless access node to manage the allocation of wireless resources to each of the available relay nodes. This could cause a relay node with a large number of connecting devices to receive inadequate signaling to provide communication services to the connected wireless devices.

Overview

The technology disclosed herein enhances the allocation of Long Term Evolution (LTE) resources to wireless relay nodes. In one implementation, a method of operating a LTE wireless access node to dynamically allocate resources to a wireless relay node includes exchanging first signals with the wireless relay node using a quality of service class identifier (QCI) and a first scheduling weight for wireless resources available to the QCI. The method further provides, receiving a device summary from the wireless relay node, wherein the device summary indicates at least a quantity of wireless communication devices communicating with the wireless relay node. The method also includes, determining a second scheduling weight for the wireless relay node based on the device summary, and exchanging second signals with the wireless relay node using the QCI and the second scheduling weight.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

FIG. 3A illustrates an operational scenario of increasing scheduling weight to a wireless relay node according to one implementation.

FIG. 5 illustrates a scheduling weight data structure to dynamically modify the scheduling weight allocated to a wireless access node according to one implementation.

FIG. 6 illustrates a scheduling weight data structure to dynamically modify the scheduling weight allocated to a wireless access node according to one implementation.

TECHNICAL DISCLOSURE

Figure 1:
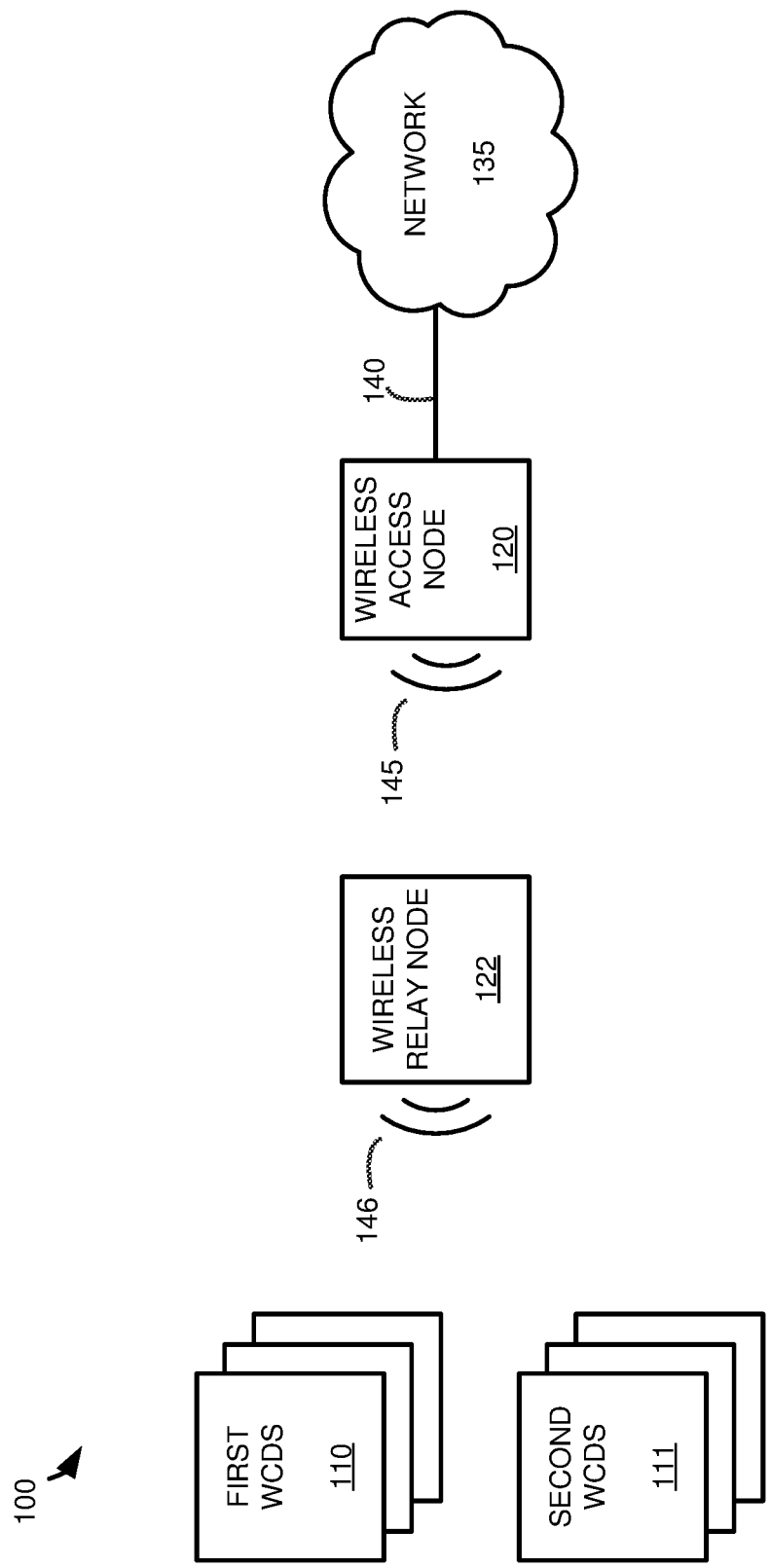
FIG. 1 illustrates a communication system to dynamically allocate signaling resources to a wireless relay node according to one implementation.

FIG. 1 illustrates a communication system 100 to dynamically allocate signaling resources to a wireless relay node according to one implementation. Communication system 100 includes wireless communication devices (WCDs) 110-111, wireless relay node 122, wireless access node 120, and network 135. Wireless relay node 122 communicates with wireless access node 120 using wireless signaling 145, and further communicates with WCDs 110-111 using wireless signaling 146. Wireless access node 120 further communicates with network 135 using communication link 140.

In operation, wireless relay node 122 is used to provide wireless communication services to applications and processes on WCDs 110-111. To provide the services, wireless relay node 122 communicates with wireless access node 120, which may comprise a macrocell eNodeB or any other similar wireless base station that connects to a Long Term Evolution (LTE) network. In particular, wireless relay node 122 may transfer an attach request to wireless access node 120, and in response to the request, wireless access node 120 may provide LTE wireless resources to wireless relay node 122, permitting the relay node to provide wireless signaling to end wireless devices. This wireless signaling to the end wireless devices may comprise LTE signaling, WiFi signaling, or any other similar wireless communication format signaling.

In the present implementation, wireless access node 120 may allocate a particular Quality of Service Class Identifier (QCI) to all wireless relay nodes of the communication system, wherein QCIs are used as a scalar mechanism in LTE to ensure bearer traffic is provided an appropriate quality of service. Accordingly, independent of the type of traffic required by the end WCDs 110-111, wireless access node 120 will provide a single QCI for all traffic transmitted and received over wireless relay node 122. To ensure that each of the devices in WCDs 110-111 is provided with adequate uplink and downlink signaling, wireless access node 120 may dynamically modify the scheduling weight at which signaling resources are provided to wireless relay node 122. This scheduling weight is used to determine when devices or communications of the same QCI are allocated wireless resources. For example, if a resource block is available to three devices with the same QCI, the allocation of the resource block will be based on the scheduling weight associated with each device. Thus, if a first device had a higher scheduling weight or scheduling probability than the other two devices, then the first devices may be more likely to receive the resource block.

In one implementation, wireless access node 120 may monitor the number of devices that are connected to wireless relay node 122, and adjust the scheduling weight associated with wireless relay node 122 based on the number of connected devices. This would permit wireless access node 120 to increase the scheduling weight of wireless relay node 122 when there are a larger number of devices communicatively coupled to the relay node, or decrease the scheduling weight of wireless relay node 122 when there are a smaller number of devices communicatively coupled to the relay node.

Figure 2:
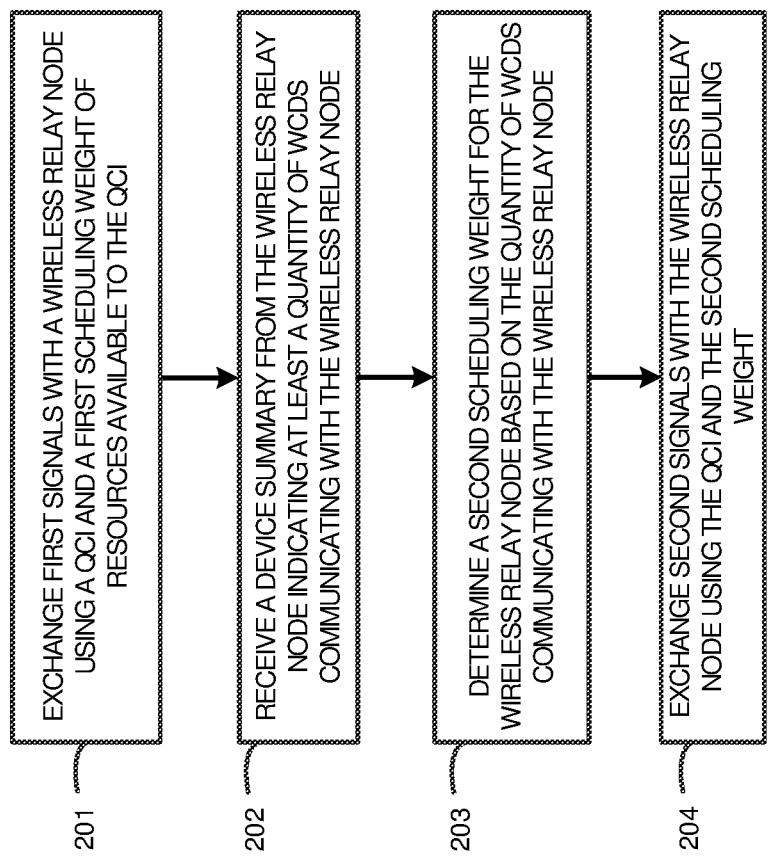
FIG. 2 illustrates a method of operating a wireless access node to dynamically allocate signaling resources to a wireless relay node according to one implementation.

FIG. 2 illustrates a method of operating a wireless access node to dynamically allocate signaling resources to a wireless relay node according to one implementation. The operations of FIG. 2 are referenced parenthetically in the paragraphs that follow with reference to the systems and elements of communication system 100 in FIG. 1.

As described previously with respect to FIG. 1, wireless relay node 122 may attach to wireless access node 120 and act as an intermediary between WCDs 110-111 and wireless access node 120. Once attached to wireless access node 120, wireless access node 120 exchanges first signals with wireless relay node 122 using a QCI associated with wireless relay node 122 and a first scheduling weight for wireless resources available to the QCI (201). This scheduling weight permits wireless access node 120 to schedule resources for wireless relay node 122 in relation to other devices and communications with the same QCI. For example, all devices with a QCI of six would be assigned resource blocks based on their scheduling weight or probability. Thus, if a device had a higher scheduling weight than other devices with the same QCI, that device would have a higher probability of being allocated a resource block when they become available.

As the signals are exchanged between wireless relay node 122 and wireless access node 120, wireless relay node 122 monitors the quantity of WCDs communicating via the relay node and transfers a device summary report to wireless access node 120 indicating at least the quantity of connected WCDs. Wireless access node 120 receives the device summary from the wireless relay node (202), and determines a second scheduling weight for wireless relay node 122 based at least on the quantity of WCDs communicating with the relay node (203). For example, if wireless access node 120 determined that a large number of WCDs are communicating with the relay node, wireless access node 120 may increase the scheduling weight for wireless relay node 122. This increase in scheduling weight permits wireless access node 120 to increase the probability that available resources are provided to wireless relay node 122 over other devices communicating with wireless access node 120. In another example, if wireless access node 120 determined that a small number of WCDs are communicating with the relay node, wireless access node 230 may decrease the scheduling weight for wireless relay node 122. This decrease in scheduling weight permits wireless access node 120 to decrease the probability that available resources are provided to wireless relay node 122 over other devices communicating with wireless access node 120.

Once the second scheduling weight is determined for wireless relay node 122, wireless access node 120 exchanges second signals with the wireless relay node using the same QCI and the second scheduling weight (204). In some implementations, it should be understood that the process of modifying the scheduling weight for a device may be accomplished at defined intervals. These intervals may be defined at the wireless relay node, which can transfer the device summary to wireless access node, or may be specified at the wireless access node which can request the device summary from the wireless relay node when required.

In some implementations, in addition to the overall quantity of devices communicating with the node, wireless relay node 122 may also be configured to identify the quantity of carrier aggregation devices connected to the relay node. Once identified, the quantity of carrier aggregation devices may be transferred in the device summary report to wireless access node 120. Wireless access node 120 may then use the quantity of carrier aggregation devices, along with the total number devices, to determine the second scheduling weight that should be used for the wireless relay node. For example, if a large number of carrier aggregation devices are communicatively coupled to wireless relay node 122, wireless access node 120 may identify that the relay node requires additional resources. Consequently, wireless access node 120 may increase the scheduling weight to wireless relay node 122 to provide the required service to WCDs 110-111.

Figure 3B:
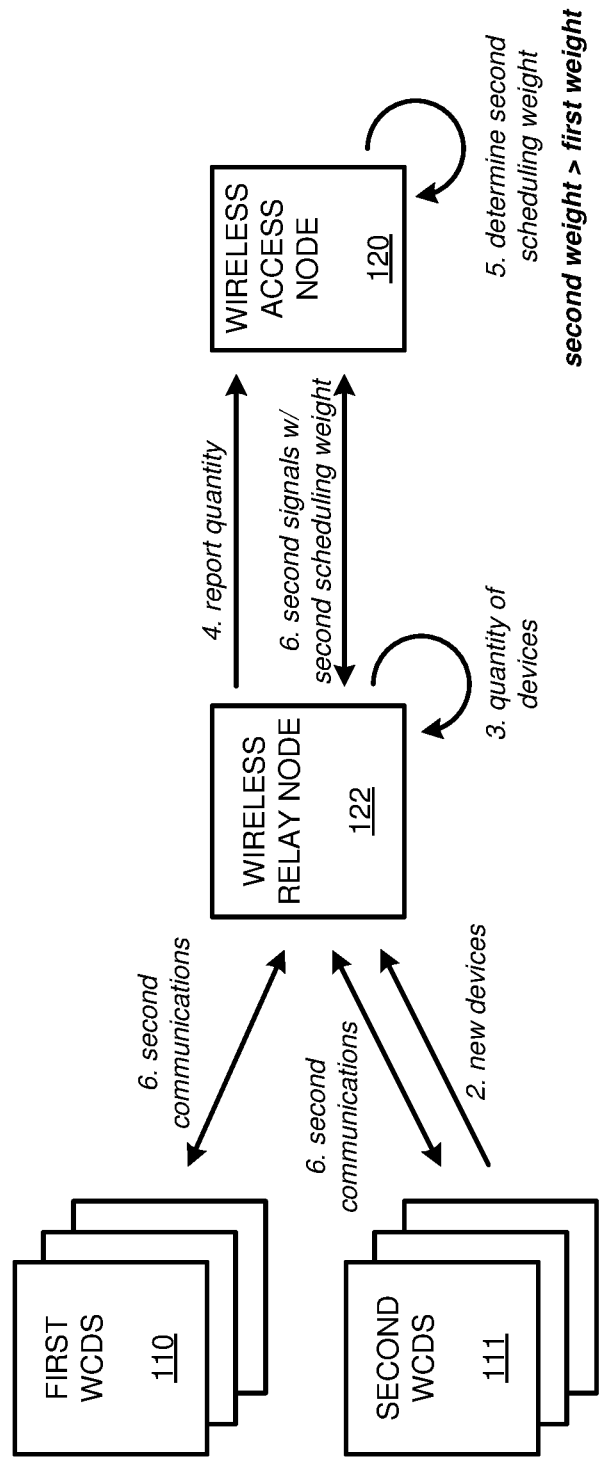
FIG. 3B illustrates an operational scenario of increasing scheduling weight to a wireless relay node according to one implementation.

FIGS. 3A and 3B illustrate an operational scenario of increasing scheduling weight to a wireless relay node according to one implementation. FIGS. 3A and 3B are illustrated with reference to systems and elements of communication system 100 from FIG. 1. In particular, FIGS. 3A and 3B will reference first WCDs 110, second WCDs 111, wireless relay node 122, and wireless access node 120.

Referring first to FIG. 3A, in operation, wireless relay node 122 attaches to wireless access node 120 to provide communication services to end user devices. Once attached to wireless access node 120, first WCDs 110 may initiate, at step 1, communications with the wireless network using wireless relay node 122 and wireless access node 120. In particular, wireless relay node 122 may communicate with first WCDs 110 using LTE signaling, WiFi signaling, or some other similar signaling, while wireless relay node 122 communicates with wireless access node 120 using LTE signaling with a first scheduling weight and QCI. The first scheduling weight dictates the probability that wireless relay node 122 will be allocated a wireless resource, such as a resource block, over another communication with the same QCI. Thus, if two devices with the same QCI were vying for the same resource block, the device with the higher scheduling weight would have a greater chance of being allocated that block.

Turning to FIG. 3B, which is a continuation of the operations described above with respect to FIG. 3A, at step 2, second WCDS 111 initiate communications with the network using wireless relay node 122. As the new devices are attached, at step 3, wireless relay node 122 determines the quantity of devices connected to the node and reports the quantity, at step 4, to wireless access node 120. Based on the number of devices that are connected to wireless relay node 122, wireless access node 120 determines, at step 5, a second scheduling weight for wireless relay node 122. Here, because there was an increase in the number of devices, wireless access node 120 may increase the scheduling weight for wireless relay node 122. This increase provides a higher probability that wireless relay node 122 will receive signaling resources over another device or communication with the same QCI. Once the weight is determined, wireless access node 120 may, at step 6, exchange second signals with wireless relay node 122 using the second scheduling weight, while wireless relay node 122 exchanges communications with first WCDs 110 and second WCDs 111.

Although illustrated in the previous example as using the quantity of devices to determine the second scheduling weight, it should be understood that the number of carrier aggregation devices may be used in place of or in addition to the overall quantity of devices. For example, the carrier aggregation information for the devices may assist wireless access node 120 in determining devices capable of using additional bandwidth, or justifying an increase in scheduling weight.

Figure 4A:
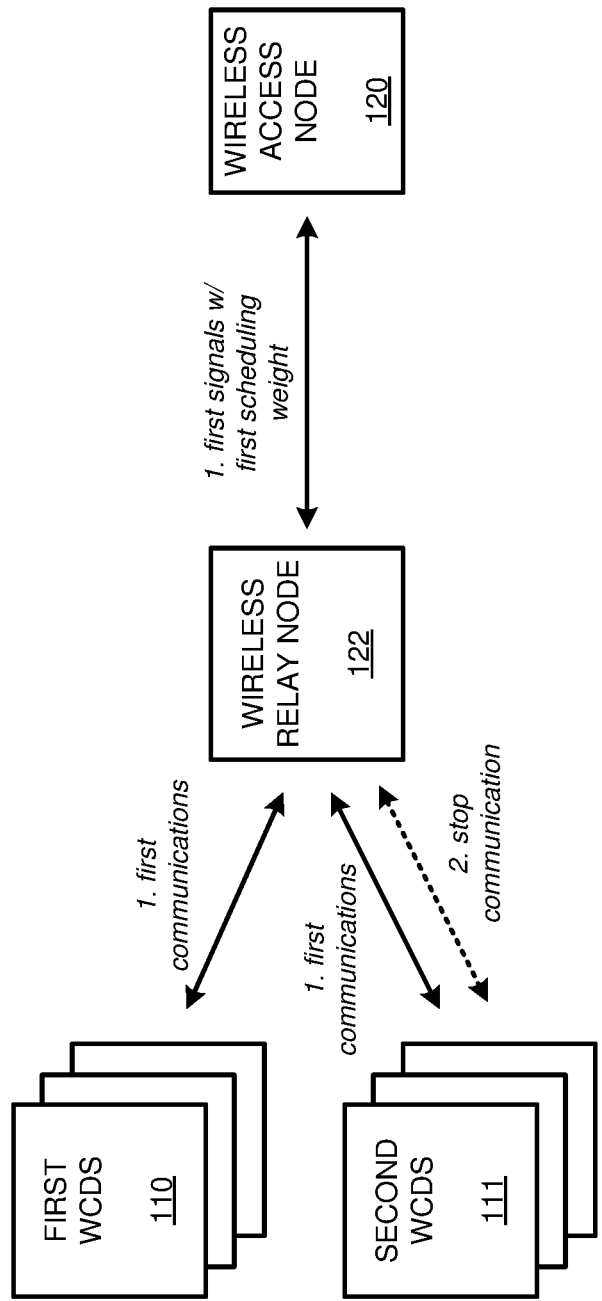
FIG. 4A illustrates an operational scenario of decreasing scheduling weight to a wireless relay node according to one implementation.
Figure 4B:
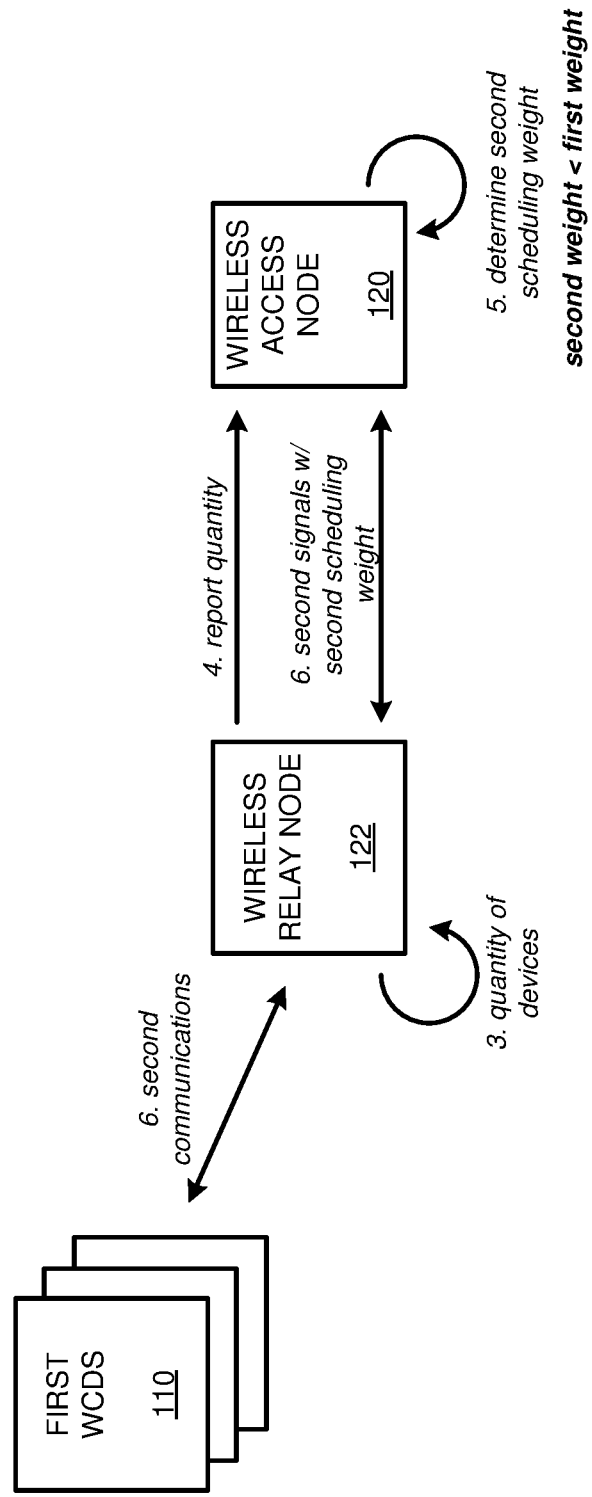
FIG. 4B illustrates an operational scenario of decreasing scheduling weight to a wireless relay node according to one implementation.

FIGS. 4A and 4B illustrate an operational scenario of decreasing scheduling weight to a wireless relay node according to one implementation. FIGS. 4A and 4B are illustrated with reference to systems and elements of communication system 100 from FIG. 1. In particular, FIGS. 4A and 4B will reference first WCDs 110, second WCDs 111, wireless relay node 122, and wireless access node 120.

Referring first to FIG. 4A, in operation, wireless relay node 122 attaches to wireless access node 120 to provide communication services to end wireless devices. Once attached to wireless access node 120, WCDs 110-111 may communicate, at step 1, with the wireless network using wireless relay node 122 and wireless access node 120. In particular, wireless relay node 122 may communicate with WCDs 110-111 using LTE signaling, WiFi signaling, or some other similar signaling, while wireless relay node 122 communicates with wireless access node 120 using LTE signaling with a first scheduling weight and QCI. The first scheduling weight dictates the probability that wireless relay node 122 will be allocated a wireless resource, such as a resource block, over another communication with the same QCI. Thus, if two devices with the same QCI were vying for the same resource block, the device with the higher scheduling weight would have a greater chance of being allocated that block by wireless access node 120. While communicating the first signals between wireless relay node 122 and wireless access node 120, second WCDs 111, at step 2, stop communications with wireless relay node 122. This stop in communications may occur as a result of completing a required communication, leaving the geographic region supported by wireless relay node 122, or any other similar purpose for stopping the communication between second WCDs 111 and wireless relay node 122.

Turning to FIG. 4B, which is a continuation of the operations described in FIG. 4A, wireless relay node 122 identifies, at step 3, a new quantity of devices communicating with the relay node, and communicates, at step 4, the new quantity of devices to wireless access node 120. Wireless access node 120 then determines, at step 5, a second scheduling weight for the communications with wireless relay node 122 and, at step 6, exchanges second signals with wireless relay node 122 using the second scheduling weight to supply communications to first WCDs 110.

Here, because second WCDs 111 ceased communications with wireless relay node 122, wireless access node 120 decreases the scheduling weight for wireless relay node 122. This decrease in scheduling weight from the first scheduling weight lowers the probability that wireless relay node 122 will receive resources in relation to other communications with the same QCI. Thus, because a lower quantity of devices is communicatively coupled to wireless relay node 122, wireless access node 120 may prioritize other devices or communications based on the decrease in devices.

Although illustrated in the example of FIG. 4B using the quantity of devices to determine the scheduling weight for wireless relay node 122, it should be understood that a quantity of carrier aggregation devices coupled to wireless relay node 122 may be used in addition to or in place of the overall quantity of devices. In particular, the carrier aggregation quantity may assist wireless access node 120 in determining the number of devices that could more effectively use additional scheduling resources provided by a scheduling weight.

FIG. 5 illustrates a scheduling weight data structure 500 to dynamically modify the scheduling weight allocated to a wireless access node according to one implementation. Scheduling weight data structure 500 includes number of devices column 510 and weight column 520. Although illustrated as a single table in the present implementation, it should be understood that one or more arrays, linked lists, data trees, tables, or other similar data structures may be used in determining the scheduling weight for wireless relay node.

As described herein, a wireless access node, such as a macro eNodeB or other similar macro LTE access node, may receive a report from a wireless relay node indicating the quantity of devices communicating via the wireless relay node. In response to receiving the quantity of devices, the wireless access node may apply the quantity value in scheduling data structure 500 to determine a scheduling weight for the wireless relay node. In particular, the quantity value received from the relay node may be applied in number of devices column 510 to determine a weight from weight column 520. Once the scheduling weight is determined, the wireless relay node may apply the scheduling weight to future communications with the relay node. This scheduling weight indicates the probability that the wireless access node will receive a wireless resource, such as a resource block, over other devices and communications with the same QCI. For example, if the wireless relay node were assigned a QCI of six, then the scheduling weight could be used to define the probability that the wireless relay node would receive a wireless resource over other communications with a QCI of six.

FIG. 6 illustrates a scheduling weight data structure 600 to dynamically modify the scheduling weight allocated to a wireless access node according to one implementation. Scheduling weight data structure 600 includes number of devices column 610, number of carrier aggregation (CA) devices column 615, and weight column 620. Although illustrated as a single table in the present implementation, it should be understood that one or more arrays, linked lists, data trees, tables, or other similar data structures may be used in determining the scheduling weight for wireless relay node.

Similar to the operations described for scheduling weight data structure 500 of FIG. 5, scheduling weight data structure 600 may be used by a wireless access node, such as a macro eNodeB or other similar macro LTE access node, to determine scheduling weights for wireless relay nodes. In particular, the wireless access node may receive a report from a wireless relay node indicating a quantity of devices connected to the relay node and a quantity of carrier aggregation devices connected to the wireless relay node. Once the report is received, the quantities may be applied to number of devices column 610 and number of carrier aggregation devices column 615 to determine a weight in weight column 620. The weight is representative of a scheduling weight that defines a probability at which the wireless relay node will receive a wireless resource over other communications with the same QCI value. Once the weight is determined, the wireless access node may communicate with the wireless relay node by scheduling resources according to the identified weight.

Figure 7:
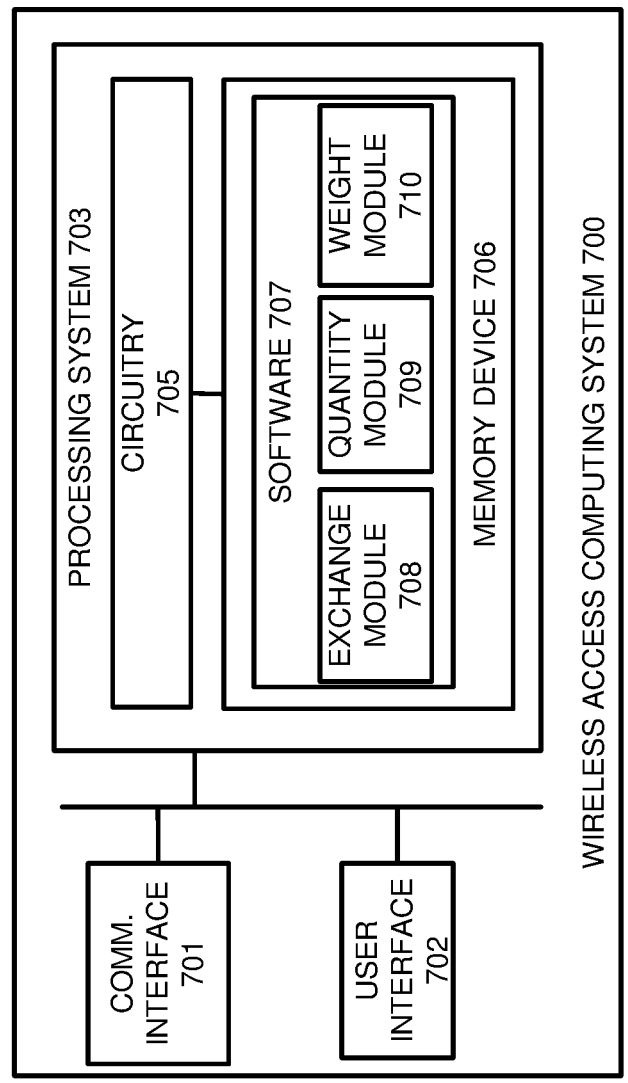
FIG. 7 illustrates a wireless access computing system to dynamically allocate signaling resources to a wireless relay node according to one implementation.

FIG. 7 illustrates a wireless access computing system 700 to dynamically allocate signaling resources to a wireless relay node according to one implementation. Wireless access computing system 700 is representative of any computing system or systems with which the various operational architectures, processes, scenarios, and sequences disclosed herein for a wireless access node may be implemented. Wireless access computing system 700 is an example of wireless access node 120, although other examples may exist. Wireless access computing system 700 comprises communication interface 701, user interface 702, and processing system 703. Processing system 703 is linked to communication interface 701 and user interface 702. Processing system 703 includes processing circuitry 705 and memory device 706 that stores operating software 707. Wireless access computing system 700 may include other well-known components such as a battery and enclosure that are not shown for clarity.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may be configured to provide LTE signaling to wireless relay nodes and end wireless communication devices. Communication interface 701 may further communicate with gateways of the LTE network to transfer and receive data for the wireless relay nodes and end user devices.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes exchange module 708, quantity module 709, and weight module 710, although any number of software modules may provide the same operation. Operating software 707 may further include an operating system, utilities, drivers, network interfaces, applications, or some other type of software. When executed by processing circuitry 705, operating software 707 directs processing system 703 to operate wireless access computing system 700 as described herein.

In particular, exchange module 708 directs processing system 703 to exchange first signals, via communication interface 701, with a wireless relay node using a QCI and a first scheduling weight for resources available for the QCI. Quantity module 709 further directs processing system 703 to receive, via communication interface 701, a device summary report from the wireless relay node indicating a quantity of WCDs communicating with the wireless relay node. Once the report is received, weight module directs processing system 703 to determine a second scheduling weight for the wireless relay node based on the quantity of WCDs communicating with the wireless relay node. After the second scheduling weight is determined, exchange module 708 directs processing system 703 to exchange second signals with the wireless relay node using the QCI and the second scheduling weight determined for the relay node.

In some implementations, to trigger the device summary report, quantity module 709 may direct processing system 703 to transfer a request to the wireless relay node, indicating that a summary report is required. However, in other implementations, it should be understood that the wireless relay node may be provided with a schedule that indicates when the wireless relay node should transmit summaries to wireless access computing system 700.

Although described in the example operation of wireless access computing system 700 as using a quantity of WCDs to determine the second scheduling weight, it should be understood that in some implementations, in addition to or in place of the quantity of WCDs, wireless access computing system 700 may use the quantity of carrier aggregation WCDs connected to the wireless relay node to determine the second scheduling weight. This carrier aggregation quantity may indicate whether the devices connected to the relay node are capable of using additional resources provided by wireless access computing system 700. Accordingly, if a large number of carrier aggregation devices are connected, computing system 700 may provide additional resources, however, if a smaller number of carrier aggregation devices are connected, computing system 700 may provide less resources to the relay node.

Figure 8:
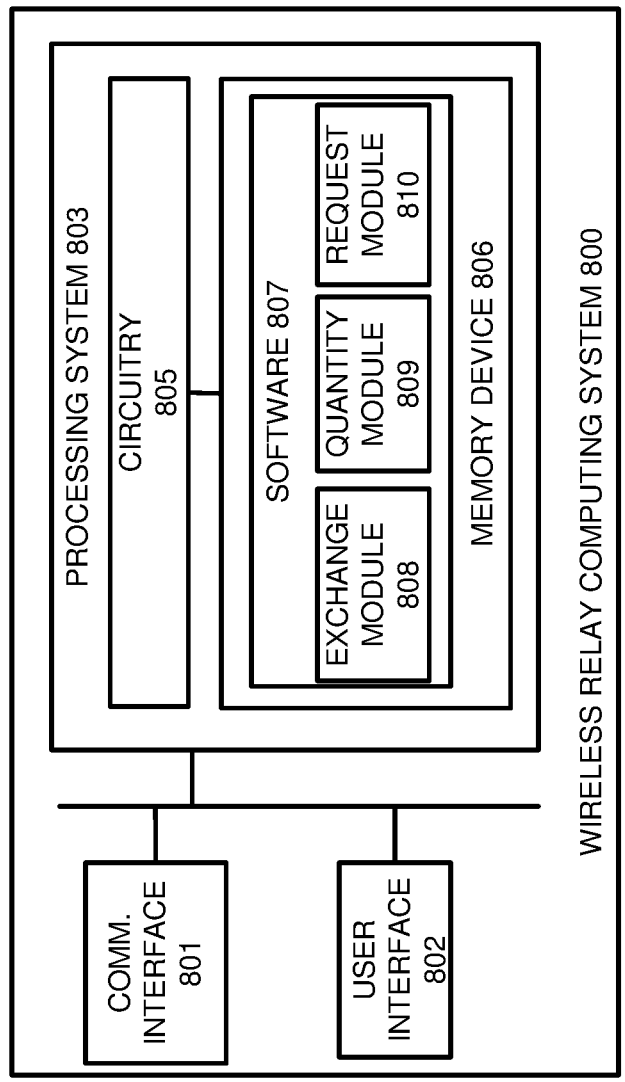
FIG. 8 illustrates a wireless relay computing system to relay communications between a macro wireless access node and end wireless communication devices according to one implementation.

FIG. 8 illustrates a wireless relay computing system 800 to dynamically allocate signaling resources to a wireless relay node according to one implementation. Wireless relay computing system 800 is representative of any computing system or systems with which the various operational architectures, processes, scenarios, and sequences disclosed herein for a wireless access node may be implemented. Wireless relay computing system 800 is an example of wireless relay node 122, although other examples may exist. Wireless relay computing system 800 comprises communication interface 801, user interface 802, and processing system 803. Processing system 803 is linked to communication interface 801 and user interface 802. Processing system 803 includes processing circuitry 805 and memory device 806 that stores operating software 807. Wireless relay computing system 800 may include other well-known components such as a battery and enclosure that are not shown for clarity.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 is configured to communicate LTE signals with a macro LTE wireless access node, such as wireless access computing system 700. Communication interface 801 further communicates with end wireless communication devices using LTE signaling, WiFi signaling, or some other similar wireless communication protocol.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable processing instructions. Operating software 807 includes exchange module 808, quantity module 809, and request module 810, although any number of software modules may provide the same operation. Operating software 807 may further include an operating system, utilities, drivers, network interfaces, applications, or some other type of software. When executed by processing circuitry 805, operating software 807 directs processing system 803 to operate wireless relay computing system 800 as described herein.

In at least one implementation, exchange module 808 directs processing system 803 to exchange, via communication interface 801, first signals with a macro LTE access node using a QCI and a scheduling weight associated with the QCI. While exchanging the first signals, quantity module 809 directs processing system 803 to determine the number of end WCDs connected to wireless relay computing system 800, and request module 810 directs processing system 803 to transfer, via communication interface 801, the quantity of WCDs to the macro LTE access node. Once the quantity is transferred to the access node, exchange module 808 directs processing system 803 to exchange, via communication interface 801, second signals with the LTE access node using the same QCI and a second scheduling weight.

In some implementations, to transfer the quantity of devices to the access node wireless relay computing system 800 may be provided with a transfer schedule that transfers the quantity without a request from the access node. However, in other implementations, the wireless access node may dictate when the quantities are transferred by transferring a request that is received by wireless relay computing system 800 using communication interface 801.

Although described as transferring a quantity of devices to the wireless access node, it should be understood that other information could also be transferred by wireless relay computing system 800. In particular, quantity module 809 may direct processing system 803 to determine the quantity of carrier aggregation devices coupled to wireless relay computing system 800. Once determined, the carrier aggregation quantity may be reported to the macro LTE access node. In some implementations, the carrier aggregation quantity may be provided with the total quantity of devices, however, in other implementations, the carrier aggregation quantity of devices may be provided as a standalone value that can be used by the macro access node in determining the scheduling weight.

Returning to the elements of FIG. 1, first and second WCDs 110-111 each comprise Radio Frequency (RF) communication circuitry and an antenna. The RF communication circuitry typically includes an amplifier, filter, modulator, and signal processing circuitry. First and second WCDs 110-111 may each include a user interface, memory device, software, processing circuitry, or some other communication components. First and second WCDs 110-111 may comprise telephones, computers, e-books, mobile Internet appliances, wireless network interface cards, media players, game consoles, or some other wireless communication apparatus, including various combinations thereof.

Wireless access node 120 comprises RF communication circuitry and at least one antenna to provide wireless communication services to wireless relay node 122. The RF communication circuitry typically includes an amplifier, filter, RF modulator, and signal processing circuitry. Wireless access node 120 may comprise a router, server, memory device, software, processing circuitry, cabling, power supply, network communication interface, structural support, or some other communication apparatus.

Wireless relay node 122 comprises RF communication circuitry and at least one antenna to provide wireless communication services to first and second WCDs 110-111 and to communicate with wireless access node 120. The RF communication circuitry typically includes an amplifier, filter, RF modulator, and signal processing circuitry. Wireless relay node 122 may comprise a router, server, memory device, software, processing circuitry, cabling, power supply, network communication interface, structural support, or some other communication apparatus.

Network 135 may comprise the wireless service provider network and may further include data service networks, such as the Internet, IMS, or some other network that provides data services to first and second WCDs 110-111. Communication network 135 may comprise switches, wireless access nodes, Internet routers, network gateways, application servers, computer systems, communication links, or some other type of communication equipment—including combinations thereof.

Wireless signaling 145 uses wireless links that use the air or space as transport media for LTE wireless communication format. Wireless signaling 146 uses wireless links that use the air or space as transport media for LTE, WiFi, or some other wireless communication format. Communication link 140 could use various communication protocols, such as Time Division Multiplex (TDM), Internet Protocol (IP), Ethernet, communication signaling, wireless communication signaling, or some other communication format—including combinations thereof. Communication link 140 could be a direct link or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a Long Term Evolution (LTE) wireless access node to dynamically allocate resources to a wireless relay node, the method comprising:
exchanging first signals with the wireless relay node using a quality of service class identifier (QCI) and a first scheduling weight for wireless resources available to the QCI;
receiving a device summary from the wireless relay node, wherein the device summary indicates at least a quantity of wireless communication devices communicating with the wireless relay node;
determining a second scheduling weight for the wireless relay node based on the device summary; and
exchanging second signals with the wireless relay node using the QCI and the second scheduling weight.

2. The method of claim 1 wherein the device summary further indicates a quantity of carrier aggregation capable wireless communication devices communicating with the wireless relay node.

3. The method of claim 1 wherein the first scheduling weight comprises a first probability of scheduling resources available for the QCI in comparison to other wireless communication devices communicating via the QCI and wherein the second scheduling weight comprises a second probability of scheduling resources available for the QCI in comparison to the other wireless communication devices communicating via the QCI.

4. The method of claim 1 wherein the wireless resources comprise resource blocks.

5. The method of claim 1 further comprising transferring a request to the wireless relay node for the device summary.

6. The method of claim 1 wherein the wireless relay node comprises a wireless node configured to exchange third signals with wireless communication devices using one of LTE signaling or WiFi signaling.

7. The method of claim 1 further comprising:
receiving a second device summary for the wireless relay node, wherein the device summary indicates at least a second quantity of wireless communication devices communicating with the wireless relay node;
determining a third scheduling weight for the wireless relay node based on the second quantity of wireless communication devices communicating with the wireless relay node; and
exchanging third signals with the wireless relay node using the QCI and the third scheduling weight.

8. A communication system to dynamically allocate resources to a wireless relay node, the communication system comprising:
a Long Term Evolution (LTE) access node configured to exchange first signals with the wireless relay node using a quality of service class identifier (QCI) and a first scheduling weight for wireless resources available to the QCI;
the wireless relay node configured to identify a quantity of wireless communication devices communicating with the wireless relay node and transfer a device summary, wherein the device summary indicates the quantity of wireless communication devices communicating with the wireless relay node;
the LTE access node configured to receive the device summary, determine a second scheduling weight for the wireless relay node based on the device summary, and exchange second signals with the wireless relay node using the QCI and the second scheduling weight.

9. The communication system of claim 8 wherein the wireless relay node is further configured to determine a quantity of carrier aggregation capable wireless communication devices communicating with the wireless relay node, and wherein the device summary further indicates the quantity of carrier aggregation capable wireless communication devices communicating with the wireless relay node.

10. The communication system of claim 8 wherein the first scheduling weight comprises a first probability of scheduling resources available for the QCI in comparison to other wireless communication devices communicating via the QCI and wherein the second scheduling weight comprises a second probability of scheduling resources available for the QCI in comparison to other wireless communication devices communicating via the QCI.

11. The communication system of claim 8 wherein the wireless resources comprise resource blocks.

12. The communication system of claim 8 wherein the LTE access node is further configured to transfer a request to the wireless relay node for the device summary.

13. The communication system of claim 8 wherein the wireless relay node is further configured to exchange third signals with wireless communication devices using one of LTE signaling or WiFi signaling.

14. The communication system of claim 8 wherein,
the wireless relay node is further configured to identify a second quantity of wireless communication devices communicating with the wireless relay node and transfer a second device summary, wherein the second device summary indicates at least the second quantity of wireless communication devices communicating with the wireless relay node, and
the LTE access node is further configured to receive the second device summary, determine a third scheduling weight for the wireless relay node based on the second device summary, and exchange third signals with the wireless relay node using the QCI and the third scheduling weight.

15. A Long Term Evolution (LTE) access node comprising:
a communication interface; and
a processing system communicatively coupled to the communication interface configured to:
exchange first signals, over the communication interface, with a wireless relay node using a quality of service class identifier (QCI) and a first scheduling weight for wireless resources available to the QCI;
receive a device summary, over the communication interface, wherein the device summary indicates at least the quantity of wireless communication devices communicating with the wireless relay node;
determine a second scheduling weight for the wireless relay node based on the device summary; and
exchange second signals, over the communication interface, with the wireless relay node using the QCI and the second scheduling weight.

16. The LTE access node of claim 15 wherein the device summary further indicates a quantity of carrier aggregation capable wireless communication devices communicating with the wireless relay node.

17. The LTE access node of claim 15 wherein the first scheduling weight comprises a first probability of scheduling resources available for the QCI in comparison to other wireless communication devices communicating via the QCI and wherein the second scheduling weight comprises a second probability of scheduling resources available for the QCI in comparison to other wireless communication devices communicating via the QCI.

18. The LTE access node of claim 15 wherein the wireless resources comprise resource blocks.

19. The LTE access node of claim 15 wherein the processing system is further configured to transfer, over the communication interface, a request to the wireless relay node for the device summary.

20. The LTE access node of claim 15 wherein the wireless relay node comprises a wireless node configured to exchange third signals with wireless communication devices using one of LTE signaling or WiFi signaling.

* * * * *